E. A. CURTIS.
SPRING SUSPENSION.
APPLICATION FILED MAR. 22, 1919.
1,425,839.
Patented Aug. 15, 1922.
2 SHEETS—SHEET 1.
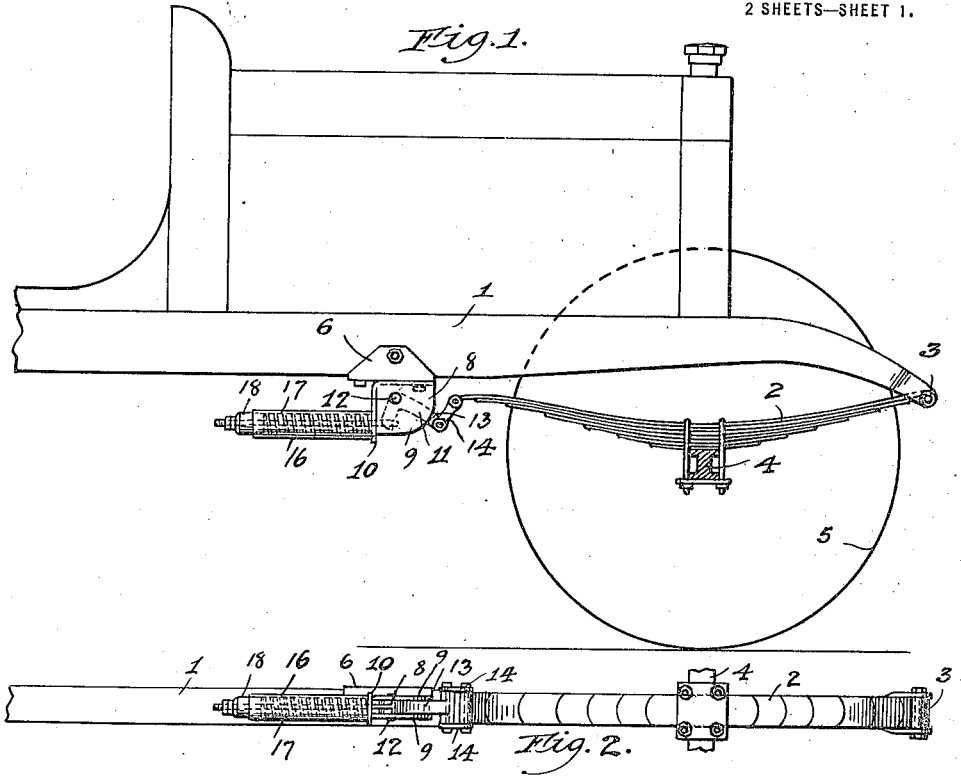
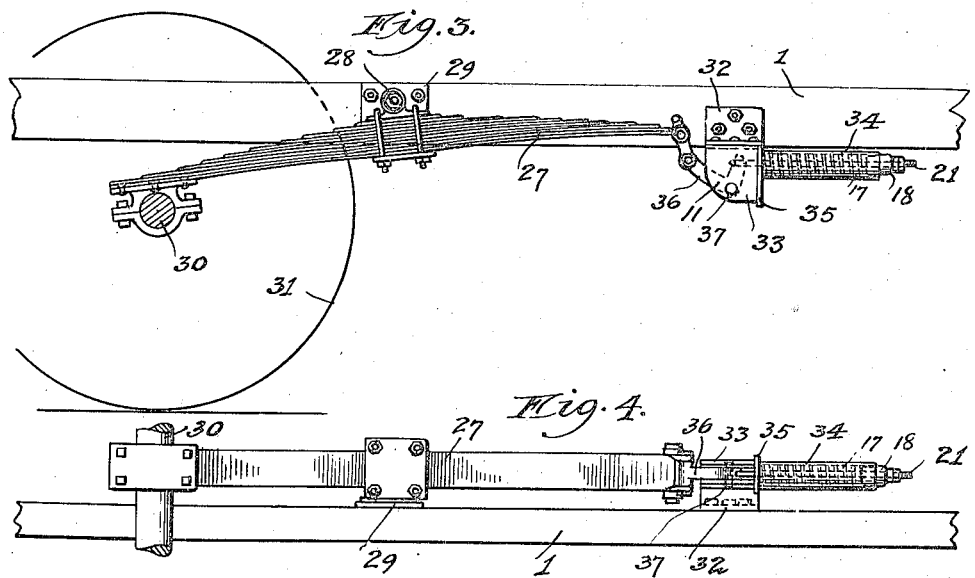
Witness,
T. B. Mann
Inventor,
Edmund A. Curtis.
By Offield, Towle, Graves & Soans,
Attys.

E. A. CURTIS.
SPRING SUSPENSION.
APPLICATION FILED MAR. 22, 1919.
1,425,839.
Patented Aug. 15, 1922.
2 SHEETS—SHEET 2.
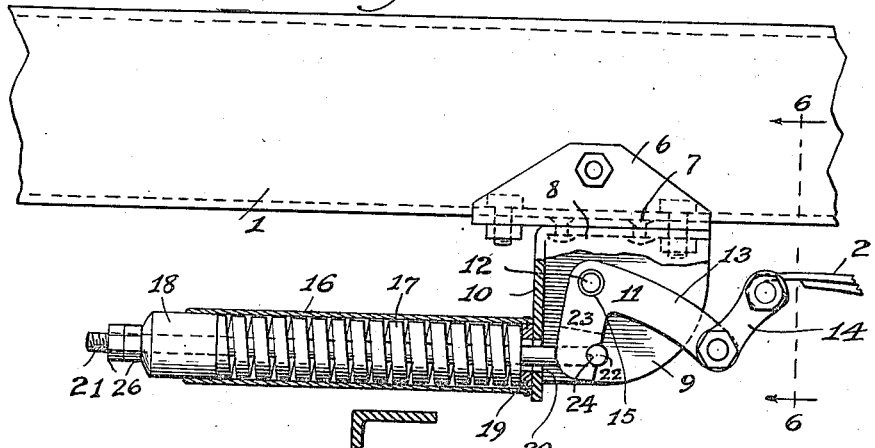
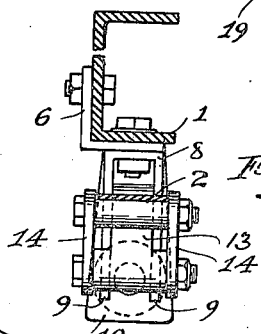
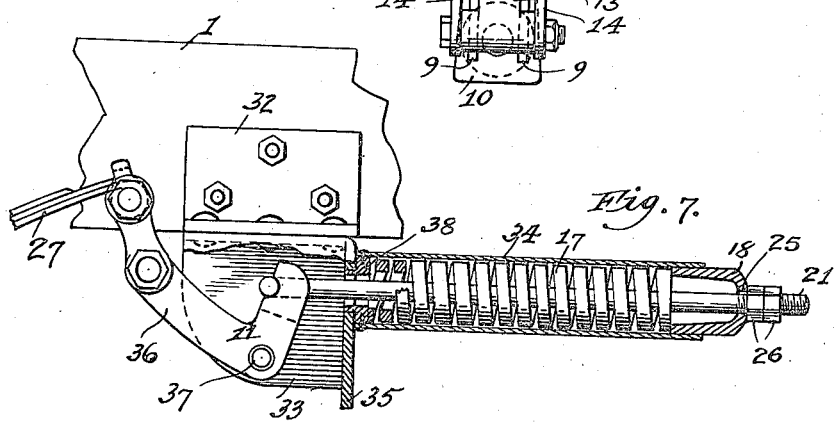
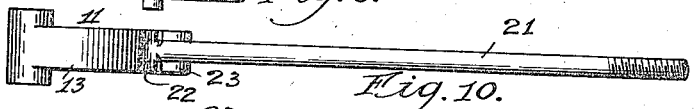
Inventor,
Edmund A. Curtis.
By Offield, Towle, Graves & Soans
Attys.

UNITED STATES PATENT OFFICE.

EDMUND A. CURTIS, OF CHICAGO, ILLINOIS, ASSIGNOR, BY DIRECT AND MESNE ASSIGNMENTS, TO CURTIS ENGINEERING CORPORATION, OF CHICAGO, ILLINOIS, A CORPORATION OF ILLINOIS.

SPRING SUSPENSION.

1,425,839.   Specification of Letters Patent.   Patented Aug. 15, 1922.

Application filed March 22, 1919. Serial No. 284,395.

*To all whom it may concern:*

Be it known that I, EDMUND A. CURTIS, a citizen of the United States, residing at 4654 Malden Street, Chicago, Cook County, Illinois, have invented certain new and useful Improvements in Spring Suspensions, of which the following is a specification.

This invention relates more particularly to mechanism which is adapted to be used on vehicles, and particularly in connection with automobiles and motor trucks to carry an end of the usual spring with which the vehicle is provided and cooperate therewith to eliminate the shock and jar resulting as the vehicle travels over a rough or irregular surface and to minimize lateral strain incident to swaying or rolling movement of the body of the car.

An important object of my present invention is the provision of a construction including a housing comprising a pair of parallel side plates, in substantial form, extending lengthwise of the body of the frame of the vehicle and secured to said frame adjacent one end of a vehicle spring, and a bell crank so formed and positioned on said housing that both arms thereof fit closely between said side plates of said housing, that the plates serve as guides to slidably confine the bell crank for movement in a single plane, and prevent twisting movement thereof on its pivot, owing to the lateral strains thereon.

In my invention the main spring of the vehicle is connected with a cushioning member to which the force of the shock or jar is transmitted through a reduction lever in a direction longitudinally of the frame of the vehicle or substantially at right angles to the direction of the force of the jar or shock, thereby eliminating the effect thereof on the vehicle.

Other objects of my invention are to provide a resilient element having the force of the road shocks and jar transmitted thereto and adapted to yield in a direction substantially at right angles to the direction of the force of such shocks or jar; to interpose a leverage between the main spring and the resilient element of my device so as to secure a ready response and extreme sensitiveness to shocks and jars, so as to prevent the transmission thereof to the body of the vehicle; to provide a construction in which the resilient element may be made of sufficient length to afford a high degree of cushioning effect, and is completely enclosed in a casing so as to operate in a lubricant, protected from dirt, and with the spring held thereby from distortion; to provide a connection of the main spring with the device which is adapted to resist lateral strains; to provide a device of this character in a substantial form, of simple construction, and convenient to attach; and in general, to provide an improved device to eliminate the transmission of road shocks and jars to the body of the vehicle.

In the drawings which illustrate a preferred form of my invention, Fig. 1 is a diagrammatic side view of the front end of an automobile with my invention applied thereto;

Fig. 2 is a bottom view of the spring suspension mechanism shown in Fig. 1;

Fig. 3 is a diagrammatic side view of the rear portion of an automobile showing my invention in connection with the rear spring of the automobile;

Fig. 4 is a bottom view of the spring suspension mechanism shown in Fig. 3;

Fig. 5 is an enlarged fragmentary view with parts in section and parts broken away showing the cushioning device and connections with the vehicle, as applied in Fig. 1;

Fig. 6 is a sectional view on the line 6—6 of Fig. 5;

Fig. 7 is a view similar to Fig. 5, showing details of construction illustrated in Fig. 3;

Fig. 8 is a fragmentary end view of the tension rod;

Fig. 9 is a fragmentary view of the bifurcated portion of the bell crank lever which is connected with the tension rod; and Fig. 10 is an assembled view of the bell crank lever and tension rod.

As shown in the drawings, the reference numeral 1 indicates one of the side sills of the frame of the automobile (either a truck or pleasure car), and has a semi-elliptic spring 2 pivotally connected at 3 to the downwardly turned forward end in the usual manner. This spring 2 extends rearwardly under the sill 1 and intermediate of its ends is attached to the front axle 4, which carries the front wheels, one of which is indicated diagrammatically at 5. The rear end of the spring 2 is commonly connected to the sill of the automobile by a link or links in which structure the spring 2 alone serves to minimize the effect transmitted to the frame of the automobile, of the shock and jar occasioned by the wheels 5 operating over a rough or irregular surface. With my invention the aforesaid links connecting the rear end of the spring 2 with the sill 1 are omitted, and the rear end of this spring is connected with the housing which is secured to the sill 1. This device, in the form illustrated in Figs. 1, 2, 5 and 6, comprises a flanged plate 6 fitting and bolted, or otherwise secured, to the sill 1 adjacent the rear end of the spring 2, and this plate is formed with or has attached thereto, by rivets 7, or in other manner to afford a secure and rigid connection, a depending housing 8 comprising parallel side-plates 9, and a rear wall 10 connecting these side-plates. A bell crank lever 11 is pivotally mounted between the side-plates 9 on a pin or shaft 12, the ends of which are secured to the side-plates 9, and has an arm 13 extending forwardly and downwardly from the pivot pin 13 and projecting beyond the side-plates 9. The forward end of this arm 13 is embraced by a pair of links 14 which are pivotally secured to the end of the arm 13, and the other ends of these links 14 embrace and are pivotally connected to the looped rear end of the spring 2. To provide a wearing surface which may be replaced when required, a removable bushing 15 may be interposed between the pivot pin 12 and the bell crank lever 11, and the pivotal connections of the links 14 with the outer end of the arm 13, and the rear end of the spring 2 may be likewise constructed for the same purpose. Secured to and extending rearwardly from the rear wall 10 of the housing 8 is a tubular casing 16, the axis of which is located at a distance below the pivot 12 of the bell crank 11. A compression spring 17 is mounted in the tubular casing 16 so as to fit somewhat closely and yet move loosely therein, and is engaged at the rear end by a cup-shaped plug 18 which is fitted to slide in the casing 16. A bushing 19 is secured in the forward end of the casing 16 and is engaged by the spring 17, and this bushing and the adjacent portion of the rear wall 10 of the housing 8 has a perforation 20 axially arranged with respect to the casing 16, through which the tension rod projects. The projecting end of this rod 21 has a T head 22, and the bell crank lever 11 has a depending arm 23, which is bifurcated to straddle the rod 21, and each of the bifurcated portions are correspondingly notched at 24, in their forward edges, to afford bearings for the opposite ends of the T head 22 of the tension rod. This tension rod extends rearwardly and axially through the casing 16, being encircled by the spring 17, and through a central perforation 25 in the cup-shaped plug 18, and has a pair of nuts 26 on the threaded end of the tension rod 21, at the outer side of the plug 18, whereby the position of the plug 18 on the rod and the tension of the spring may be adjusted.

Obviously the swinging of the arm 23 of the bell crank lever effects a slight vertical displacement of the forward end of the rod 21, and the plug 18 is cored out, as shown in Fig. 7, to permit such displacement without tension on the rod, and also to afford a plug of light weight.

My invention is designed to be used with various forms of main springs, and for the purpose of illustrating its adaptability to other types of springs than that which I have just described, I have shown in Figs. 3, 4 and 7, a cantilever spring which is oftentimes used for supporting the rear end of a car, and is so illustrated in these figures.

The cantilever spring is indicated at 27, and is centrally pivoted at 28 to bracket 29 on the side of the sill 1, and has the rear axle 30, or axle housing, as the case may be, which carries the rear wheels, one of which is indicated diagrammatically at 31, clamped to the rear end thereof.

The forward end of the spring 27 is connected with a bell-crank 11, through link 14 which is the same as hereinbefore described except that it is modified as necessitated to adapt it for use with this cantilever spring 27.

A bracket 32 is secured to the sill and has a housing 33 secured thereto and similar to the housing 8 previously described. This housing 33, however, is offset at one side of the sill 1 instead of being positioned directly therebelow as in the previously described structure, and has the tubular casing 34 placed near the top of the rear plate 35 of the housing, and the bell crank lever 36 is pivoted between the side plates of the housing 33 at 37, near the lower end of the side-plates. The device is otherwise the same as the structure previously described, the difference consisting in such changes as are necessary to effect a reversal of the device to provide for a downward pressure of the spring 27 on the arm of the bell crank lever 36 instead of an upward pull on the arm 13 of the bell crank lever 11 which the spring 2 exerts thereon in the previously described structure.

In Fig. 1 I have also indicated at 38, a modified form of bushing in the inner end of the casing 34 against which the spring 17 is compressed, the bushing 38 being provided with a flange which fits in the opening through the rear wall 35 of the housing 33 to bush the entire opening through which the tension rod 21 extends.

The bell crank in my device is constructed so that both arms thereof fit closely between the side-plates of the housing 8, so that the said plates serve as guides to confine the bell crank for movement in a single plane, and prevent twisting movement thereof on its pivot owing to the lateral strains imposed thereon. This bell crank lever is shown herein in an angular form with a pair of arms extending from the pivot, but, if desired, it may be constructed in the form of a disc or a solid block so as to afford greater surface engagement with the lateral walls of the housing and is, of course, in such cases provided with suitable connections for the connection of the main spring and the tension rod therewith.

The casing 16 serves as a guide for the spring 17 to prevent buckling or bowing, or any other deformation thereof, under the tension to which it is subjected, and together with the plug 18 and the bushing at the forward end of the casing, encloses the spring so that it may be packed in grease, to insure constant lubrication and easy operation. The use of the tubular casing to enclose the spring permits a longer spring to be used, and therefor a greater resiliency is afforded, and the arms of the bell crank lever are constructed of such a length that there is a reduction in movement between the end of the main spring and the tension rod of the cushioning member of about two to one, which ratio of movement together with the length of the spring 17 enables the end of the main spring, which is connected to the cushioning member, to move readily in response to shocks and jarring movement resulting from unevenness of the surface over which the wheels travel, and prevents any effect of the shocks or jars from being felt by the occupants of the car. This elimination of the transmission of the jar and vibration results to a great extent from the fact that the cushioning element operates in a direction transversely to the direction of application of the shocks and jars to the vehicle, and the shock is expended in a direction longitudinally of the car frame without transmitting rebound or bouncing strain to the car body.

It will be further noted that this device may be applied to various types of both pleasure cars and trucks in a convenient manner, and in an inconspicuous place; that it is placed in direct alignment with the main spring of the vehicle so that normally there is no torsional or other strain thereon except such as is in a direction of compression of the spring, and furthermore, that the side-plates of the housing in which the bell crank lever is mounted closely engage the sides of the lever and serve as guides to effectively hold the lever in the proper position against lateral strains incident to swaying and turning movement of the car.

It is to be understood that I have illustrated and described my invention in a structure representing a preferred embodiment of the invention in connection with certain types of springs. However, various changes and modifications may be made therein, as the particular use of the invention may require, without departing from the principles of my invention, the scope of which is to be determined by reference to the appended claims.

By thus showing and specifically describing the embodiment herein of my invention, I do not intend to restrict the range of equivalents more than is made necessary by the prior state of this art.

I claim:

1. The combination with a vehicle having an axle and a body frame and an elongated leaf spring resiliently supporting the frame on the axle, of a housing secured to the frame adjacent one end of the leaf spring and having a pair of parallel side-plates, a bell crank pivoted between and slidably engaging the side-plates of the housing, a link connecting one arm of said bell crank with the end of the leaf spring and a spring connected with the other arm of the bell crank to yieldingly resist pivotal movement thereof.

2. In the combination defined in claim 1, the spring which resists pivotal movement of the bell crank being a coiled compression spring and a tubular guide enclosing said spring supported rigidly on the housing.

3. In the combination defined in claim 1, the spring which resists pivotal movement of the bell crank being a coiled compression spring and a tubular guide enclosing said spring and supported rigidly on the housing, the axis of said tubular guide lying in a plane substantially midway between the parallel side-plates of the housing.

4. The combination with a vehicle having an axle and a body frame, and an elongated leaf spring resiliently supporting the frame on the axle; of a housing secured to the frame adjacent one end of the leaf spring and having a pair of parallel side-plates; a bell crank pivoted between and slidably engaging the side-plates of the housing and having a long arm and a short arm, a link connecting the long arm with the end of the leaf spring and a spring connected with the short arm of the bell crank to yieldingly resist pivotal movement of the bell crank.

5. The combination with a vehicle having an axle and a body frame, and a leaf spring yieldingly supporting the frame on the axle; a housing secured to said frame adjacent the end of the leaf spring and having a pair of parallel vertically arranged plates extending lengthwise of the body frame; a tubular casing extending from the said plates longitudinally of the frame; a bell crank pivoted between the parallel plates and having a long and short arm slidably engaging the plates and confined thereby for pivotal movement in a vertical plane; a compression spring in said tubular casing; a plunger in the outer end of the tubular casing for compressing the spring therein; a tension rod pivotally connected with the short arm of the bell crank and extending concentrically through the tubular casing and adjustably connected with said plunger at the outer end of said casing, and a link pivotally connected with the end of the leaf spring and with the outer end of the long arm of the bell crank.

6. A cushioning element for a vehicle comprising a bracket adapted to be secured to the sill of the vehicle, and having a pair of parallel plates, a bell crank pivoted between the parallel plates and having a long arm and a short arm slidably engaging the parallel plates; a tubular barrel connected with and having the axis thereof parallel with the parallel plates; a plug slidably engaged in the outer end of the tubular barrel; a tension rod extending concentrically through the tubular barrel and pivotally connected with the short arm of the bell crank and adjustably connected with the plug in the outer end of the barrel; a compression spring in the tubular casing interposed between said plug and said parallel plates, and means at the outer end of the long arm of the bell crank for pivotally connecting said arm with a main spring of a vehicle.

7. The combination of a body frame, a vehicle spring, a housing comprising a pair of parallel side-plates secured to and extending lengthwise of the body frame at a point adjacent one end of the vehicle spring, a bell crank formed and positioned in said housing so that both arms thereof fit closely between said side plates of said housing and the plates serve as guides to slidably confine the bell crank for movement in a single plane and prevent twisting movement thereof on its pivot owing to lateral strain, a cushion member comprising a compression element mounted in a tubular casing which serves as a guide against deformation of the compression element, said casing being mounted on and carried by said housing.

March 20, 1919.

EDMUND A. CURTIS.